United States Patent Office 2,866,556
Patented Dec. 30, 1958

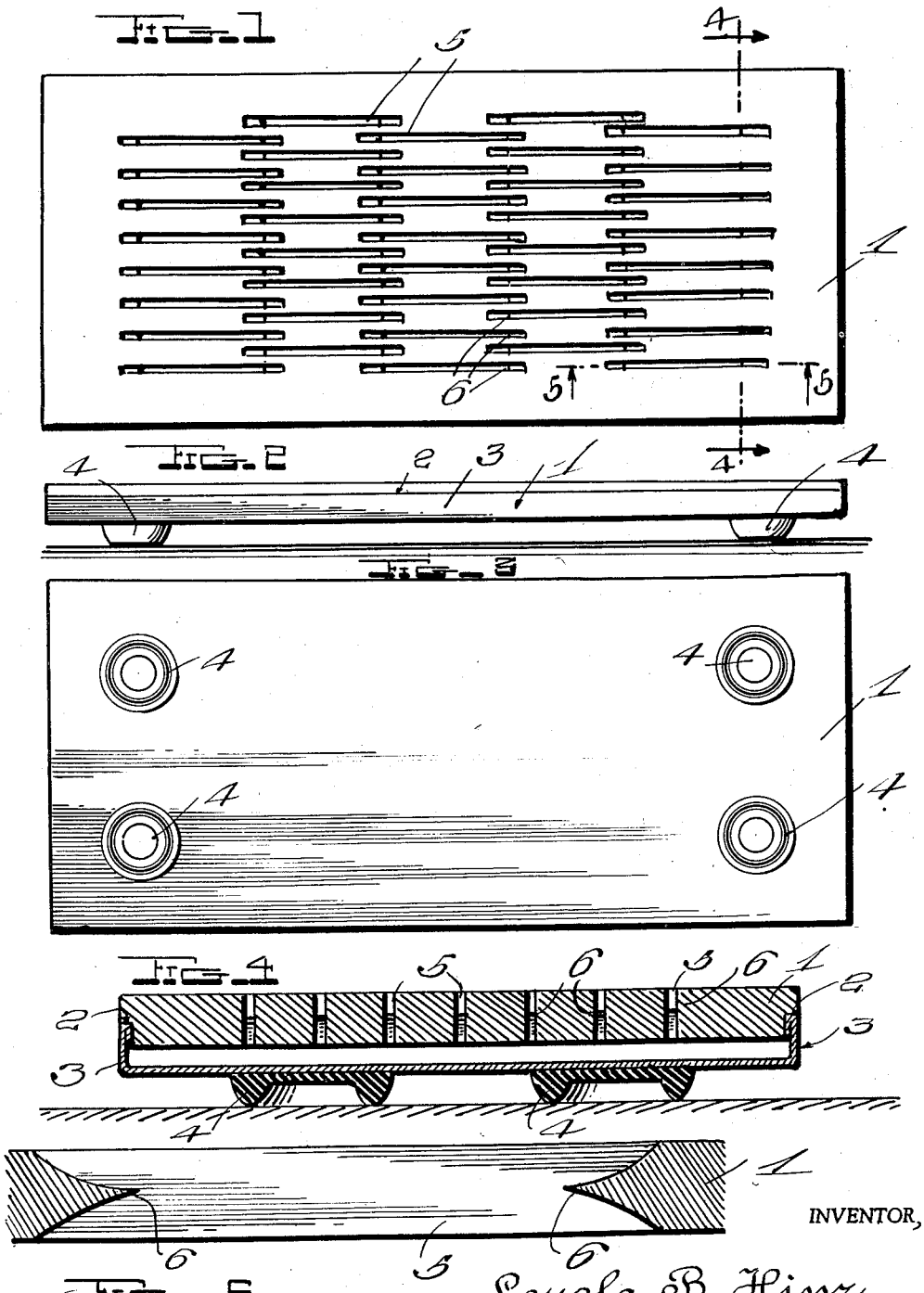

2,866,556
DRIP BOARD DEVICE FOR MEATS
Loyola B. Hinz, Merrill, Wis.
Application July 14, 1955, Serial No. 522,033
1 Claim. (Cl. 210—498)

This invention relates to a drip board device for meats.

An object of the invention is to provide a device of a unique structure comprising primarily a peculiarly formed drip board and a pan for receiving the juices assembled in an efficient manner with said drip board.

Another object of this invention resides in the forming of the slots in the board in such a manner as to produce at the ends of each slot in the board a very proficient draining structure, whereby the slots are kept very clean during the use of the device.

A further object of this invention is the construction of the staggered slots in a peculiar manner that results in the formation of substantially V-shape ends of each individual slot.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a top plan view of a device constructed in accordance with the present invention, while Figure 2 is a view in side elevation thereof.

Figure 3 is a bottom plan view of the device.

Figure 4 is a transverse sectional view of the device taken on line 4—4, Figure 1, and looking in the direction of the arrows.

Figure 5 is an enlarged sectional view of the device taken on line 5—5, Figure 1, and looking in the direction of the arrows, the pan of the device being omitted.

Referring to the drawings by numerals, 1 designates the board of the device; it is understood that I use the term "board" in a broad sense, meaning any material that is susceptible of being used in carrying out this invention.

All around the outer edge of board 1 is a small inverted L-shape socket 2, Fig. 4. Into this socket 2 the upper edges of pan 3 tightly fit, as shown clearly in Figure 4. The pan 3 is for receiving the juices of the meat which is being handled on top of the board 1. This pan 3 is provided on its bottom preferably with four rubber feet 4, as shown.

It has been discovered that a rotary saw is admirably adapted for cutting the staggered slots in the board. The cutting of each slot 5 is carried out by what might be called "spot cutting," as the rotary saw is brought into contact with the body of the board, resulting in partly cutting through said board and then by reversing the position of the board being operated upon, the rotary saw can complete from the other side of the board the formation of the slot 5, resulting in the new discovery of forming the substantially V-shape cutting ends 6.

I have also discovered that by staggering the slots 5, as shown, a stronger board is produced. Further, the staggering structure furnishes a greater working surface.

The juices quickly pass from the top of the board 1 into the slots 5 and thence down the inclined surfaces of the ends to the sharp cutting edges 6 and thence drop quickly from these edges 6 into the pan 3 thereunder. This makes a clean job that can only be obtained by the unique and novel structure of the ends of these slots.

This useful structure is unique in the way it is produced and then the way in which the device operates, thereby constituting a valuable discovery.

As particularly shown in Figure 2 this novel device is compact, the board fitting down snugly in the top portion of the pan 3, although the board when desired can be quickly detached from the pan for getting at the juices which may have been deposited in the pan.

As shown particularly in Figure 1, the staggering of the slots 5 causes each slot to overlap the contiguous slots, especially is this true with the slots arranged at the center of the board, whereby a more substantial operating surface is produced with no weakening effect as would be the case if each individual slot was extended from end to end of the board.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

It is to be understood that the board 1 is nested in the pan 3 as shown and described.

What I claim is:

A meat cutting board having flat cutting surfaces and having a plurality of longitudinally extending parallel drain slots through the board, the slots being arranged in transverse groups and each slot being narrow as compared with the transverse spacing of the slots in its group, the ends of the slots in each group being transversely aligned with the ends of the slots in the adjacent group and transversely alternating therewith, and the slots having end portions which are flared longitudinally upwardly to elongate the slots in the vicinity of the surface of the board so that only the flared end portions of the slots overlap by a distance which is small as compared with the length of the slot.

References Cited in the file of this patent

UNITED STATES PATENTS

| 87,385 | Winchester | Mar. 2, 1869 |
| 105,755 | Winchester | July 26, 1870 |
| 454,552 | Wheeler | June 23, 1891 |
| 942,121 | White | Dec. 7, 1909 |
| 1,222,390 | Gorham | Apr. 10, 1917 |
| 1,940,952 | Hutchens | Dec. 26, 1933 |
| 1,971,546 | Tuttle | Aug. 28, 1934 |
| 2,732,696 | Baker | Jan. 31, 1956 |

FOREIGN PATENTS

| 7,629 | Great Britain | 1900 |